March 21, 1939.    O. KNOERZER    2,151,296
SHUT-OFF VALVE
Filed Dec. 6, 1937
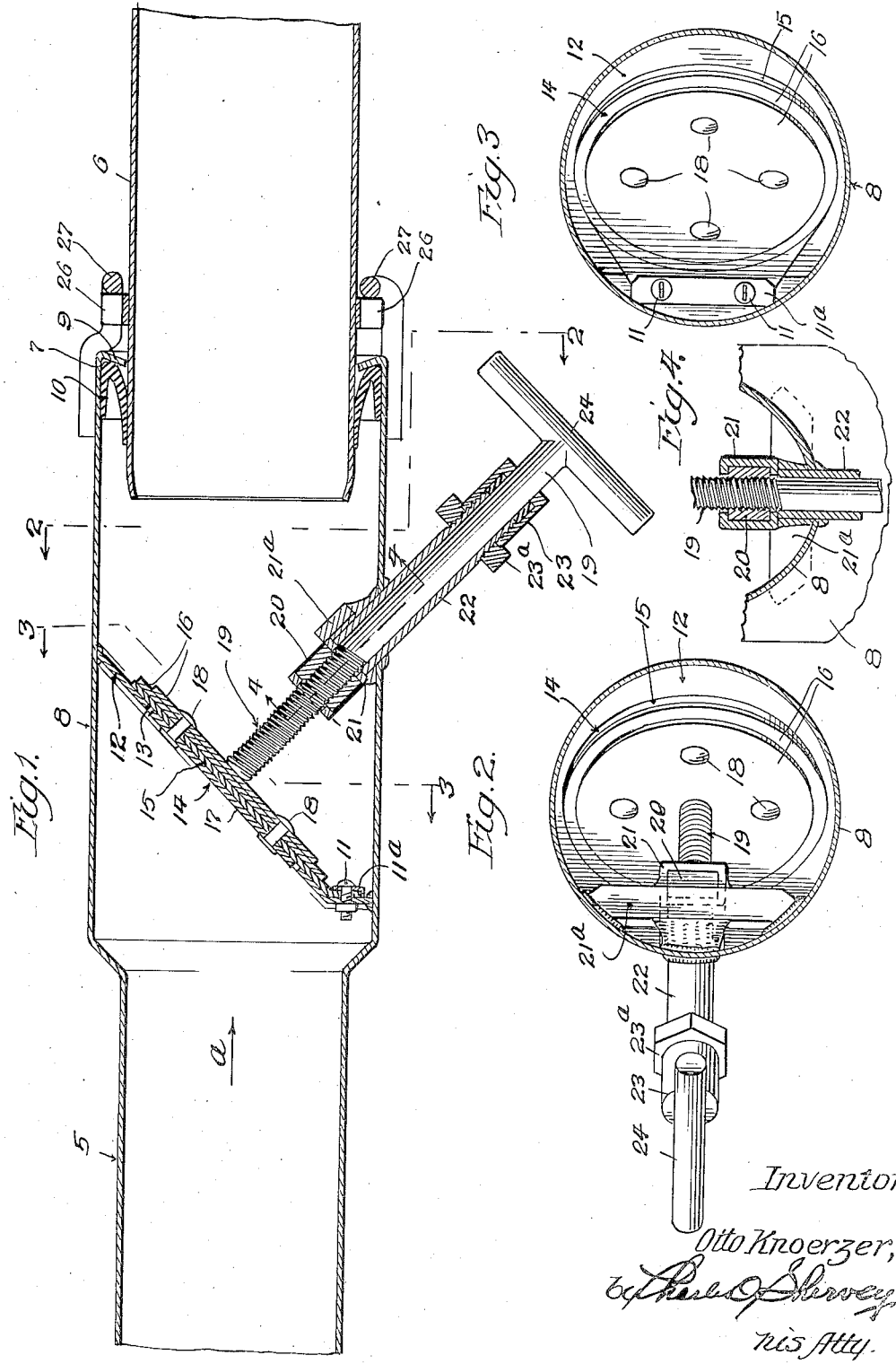
Inventor:
Otto Knoerzer,
his Atty.

Patented Mar. 21, 1939

2,151,296

UNITED STATES PATENT OFFICE 2,151,296

SHUT-OFF VALVE

Otto Knoerzer, Hammond, Ind., assignor to Champion Corporation, Hammond, Ind., a corporation of Indiana Application December 6, 1937, Serial No. 178,243

3 Claims. (Cl. 251—158)

This invention relates to shut-off valves and in its present form it has been designed more particularly for use in connection with irrigation pipes.

Irrigation pipes are usually made from light gauge sheet metal for the purpose of economy and lightness, and such pipes are formed in sections with leak-proof joints and couplings between them whereby they may be quickly and easily joined together into long lengths of pipe.

As an illustration of the joint used, reference may be had to my prior Patent No. 2,066,088 dated December 29, 1936, for improvements in Irrigating pipes.

The principal object of the present invention is the provision of a simple, practical and highly efficient valve, formed as a part of or separate from a pipe section. Irrigation pipes are made of several sizes and in some instances are as large as six inches in diameter. Inasmuch as the pipes are formed of light gauge sheet metal, considerable difficulty has been encountered in the provision of a valve therefor that can hold against high pressure and one that is not likely to get out of repair or become injured by reason of the rough usage to which pipes of this character are subjected. Another object is to provide a simple and practical valve that will fulfill these requirements.

With these and other objects and advantages in view, this invention consists in the several novel features of construction, arrangement and combination of parts hereinafter fully set forth and claimed.

The invention is clearly illustrated in the drawing accompanying this specification in which:

Fig. 1 is a central, longitudinal section through fragments of two irrigation pipe sections taken at the joint between the two, and showing the application thereto of a valve embodying a simple form of the present invention.

Fig. 2 is a vertical, cross section taken on the line 2—2 of Fig. 1.

Fig. 3 is a vertical, cross section taken on the line 3—3 of Fig. 1.

Fig. 4 is a detail, fragmental section taken on the line 4—4 of Fig. 1.

Referring to said drawing, the reference characters 5, 6, designate fragments of two irrigation pipe sections connected together by a leak-proof joint 7. The pipe sections are desirably formed from light gauge sheet metal suitably formed into pipes. On one end of each pipe section is welded or otherwise suitably fastened a bell 8, which is of greater diameter than the main part or body of the pipe section and usually having on its extremity an inwardly turned flange 9 forming with the wall of the bell, an annular channel in which is contained a rubber or other resilient gasket 10 generally U or V shaped in cross section and formed with annular lips that bear respectively against the internal face of the bell and against the external face of the adjacent pipe section and preserve a leak-proof joint therebetween. Obviously, other forms of watertight joints may be provided between the adjacent pipe sections.

The pipe sections are coupled together by lugs 26 on one end of each pipe section and loops 27 on the bell end of the section as in my prior patent above referred to.

As is well understood, an irrigation pipe may be run from a pump located adjacent a body or stream of water to a distant point, and branch pipes may run from the main pipe to other places, and sprinklers or other water distributors may be attached to the main and other branch pipes. The valves may be interposed anywhere along the pipe or its branches to control the flow of water and to shut it off from one or more of its branches or at any desired point along the length of the main pipe.

Inasmuch as it is desirable not to restrict the maximum flow of water through the pipe when the valves are open, I have found that the ideal place for the location of the valves is in the bell of any pipe which is to be equipped with a valve because the valve opening of the valve device may be made as large as the cross sectional area of the main part or body of the pipe.

Welded or otherwise suitably fastened to the internal face of the bell wall is obliquely positioned a cross-wall 12 provided with an outlet opening 13 of the same cross sectional area as that of the main body of the pipe section. The entire edge portion of the cross-wall 12 is fastened to the bell wall and, when the outlet opening 13 thereof is closed by the valve, it completely shuts off the flow through the pipe beyond the valve.

Desirably, the valve 14 is in the form of a flap valve and seats upon that part of the cross-wall 12 which surrounds the outlet opening 13 therein. Desirably, the valve is composed of a fiber or other flexible valve disc 15 swingably fastened along one edge portion to the cross-wall 12 as by bolts and nuts 11, a strip of metal 11ª being preferably interposed between the fiber strip and the heads of the bolts and providing a straight line along which the flexible valve disc 15 may bend in opening and closing the outlet opening in the cross-wall. On both sides of the flexible valve disc are metal reenforcement discs 16, 17, which are secured to the flexible disc by rivets or other fastening means 18. The disc 17 is of somewhat less diameter than that of the outlet opening in the cross-wall and enters the opening when the valve is closed, and the disc or discs 16 are preferably of substantially the same diameter as that of the flexible valve disc. The flow through the pipe is in the direction of the arrow, a, in Fig. 1, and consequently the valve is capable of being opened by the water pressure against it. Means are provided for closing the valve and the simple means illustrated comprises a threaded stem 19 which is positioned to stand at right angles to the cross-wall 12 and to engage the valve 14 (when closed) at the center of the outlet opening and consequently at the center of the reenforcing discs. The threaded stem 19 is threadedly engaged with a threaded member such as a bronze nut 20 stationarily held in a strap shackle 21 from which extends a sleeve, here shown as comprising a piece of pipe 22 that projects through a hole in the bell wall and extends into the interior of the bell and externally thereof as well. The sleeve provides a guide for the threaded stem 19. The strap forming the shackle 21 is bent up into rectangular form as is clearly seen in Fig. 4 to receive the nut 20, and said nut is held by said strap shackle against turning when the threaded stem is being manipulated. The strap shackle and sleeve 22 are welded together and are also welded to the bell wall so as to provide a rigid solid support for the threaded stem, and to further reenforce the parts a cross bar 21ª is welded to the strap shackle and sleeve and its ends are welded to the bell wall. The outer end of the sleeve is threaded for the reception of a packing nut 23 and set nut 23ª and suitable packing material is interposed between the end of the sleeve and the end wall of the packing nut to guard against any leakage. Upon the outer end of the threaded stem is a handle 24, by means of which it may be manipulated. Desirably, the strap shackle has an open side through which the nut 20 may be inserted into it and when the threaded stem has been engaged with the nut, the latter is positively retained in its place in the strap. Preferably, the walls of the strap shackle form a square recess for the reception of a square nut of substantially the same size as the recess whereby the nut is effectively held against turning therein.

The cross-wall 12, valve 14, stem 19 and associated parts are all located between the ends of the bell, which is made of sufficient length to accommodate these parts.

When the threaded stem is retracted, water pressure against the valve in the direction of the arrow, a, in Fig. 1 forces the valve off its seat on the cross-wall thereby uncovering the outlet opening and permitting the water to flow freely through the opening and through the remainder of the pipe to the next valve or outlet.

When necessary to close the valve, the attendant merely screws down the threaded stem until it fully seats the valve on the cross-wall, thereby effectively closing the outlet opening therethrough and shutting off the flow of water beyond the valve.

It will be observed that when the threaded stem has been screwed down to fully close the valve, the end of the stem then engages upon the center point of the valve discs, thereby forcing the entire surrounding part of the fiber valve disc tightly upon its seat. It has been found in actual practice that, although the pressure against the valve may be very high, it requires but little effort on the part of the attendant to close down the valve against the pressure.

I claim as new and desire to secure by Letters Patent:

1. In an irrigation pipe valve, a sheet metal valve casing having a water passage therethrough, a screw threaded valve stem for opening a swinging disclike valve therein, said stem projecting outwardly through the casing wall, a sleeve externally of the casing, in which said stem is guided, a nut formed of non-corrosive metal with which the threads of the valve stem are threadedly engaged, and means to receive the nut and hold the same against rotation, said last mentioned means being welded to the sleeve and casing wall, and the sleeve being welded to the casing wall.

2. In an irrigation pipe valve, a sheet metal valve casing having a water passage therethrough, a screw threaded valve stem for opening a swinging disclike valve therein, said stem projecting outwardly through the casing wall, a sleeve externally of the casing, in which said stem is guided, a nut formed of non-corrosive metal with which the threads of the valve stem are threadedly engaged, and a shackle in which the nut is held against rotation, the shackle, sleeve and casing wall being welded together.

3. In an irrigation pipe valve, a sheet metal valve casing having a water passage therethrough, a screw threaded valve stem for opening a swinging disclike valve therein, said stem projecting outwardly through the casing wall, a sleeve externally of the casing, in which said stem is guided, a nut formed of non-corrosive metal with which the threads of the valve stem are threadedly engaged, a shackle in which the nut is held against rotation, and a shackle holding bar, the shackle, bar, sleeve and casing being welded together.

OTTO KNOERZER.